(12) United States Patent
Heap et al.

(10) Patent No.: US 9,904,293 B1
(45) Date of Patent: Feb. 27, 2018

(54) SYSTEMS AND METHODS FOR AUTOMATICALLY TRAILERING A MARINE VESSEL ON A BOAT TRAILER

(71) Applicant: Brunswick Corporation, Lake Forest, IL (US)

(72) Inventors: David M. Heap, Fond du Lac, WI (US); Troy J. Kollmann, Mt. Calvary, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/377,612

(22) Filed: Dec. 13, 2016

(51) Int. Cl.
| | |
|---|---|
| G05D 1/12 | (2006.01) |
| G05D 1/02 | (2006.01) |
| G05D 1/00 | (2006.01) |
| B63H 25/04 | (2006.01) |
| B63H 25/02 | (2006.01) |

(52) U.S. Cl.
CPC .............. *G05D 1/12* (2013.01); *B63H 25/04* (2013.01); *G05D 1/0022* (2013.01); *G05D 1/0206* (2013.01); *B63H 2025/028* (2013.01); *B63H 2025/045* (2013.01)

(58) Field of Classification Search
CPC .................................. G05D 1/12; B63H 25/04
See application file for complete search history.

(56) References Cited

U.S. PATENT DOCUMENTS

| | | | |
|---|---|---|---|
| 3,673,553 | A | 6/1972 | Miura et al. |
| 3,707,717 | A | 12/1972 | Frielinghaus |
| 6,142,841 | A | 11/2000 | Alexander, Jr. et al. |
| 6,234,853 | B1 | 5/2001 | Lanyi et al. |

(Continued)

FOREIGN PATENT DOCUMENTS

| | | |
|---|---|---|
| JP | 04101206 A | 2/1992 |
| JP | 2007248336 A | 9/2007 |

(Continued)

OTHER PUBLICATIONS

Ward, Aaron, "Marine Vessel Station Keeping Systems and Methods," Unpublished U.S. Appl. No. 15/138,860, filed Apr. 26, 2016.

(Continued)

*Primary Examiner* — Alex C Dunn
(74) *Attorney, Agent, or Firm* — Andrus Intellectual Property Law, LLP (57) ABSTRACT

A system for automatically trailering a marine vessel includes a set of coded tags coupled to a boat trailer, each storing data regarding its location on the trailer. A tag reader is located aboard the vessel, and estimates a first distance to a first coded tag in the set and a second distance to a second coded tag in the set. A position determination module uses the first and second estimated distances to determine position and heading of the vessel and the trailer in a given coordinate system. A feedback control module calculates a difference between the positions of the vessel and the trailer and a difference between the headings of the vessel and the trailer and determines vessel movements required to minimize the position and heading differences. A marine propulsion system automatically actuates a propulsion device to produce the required vessel movements to propel the vessel onto the trailer.

20 Claims, 6 Drawing Sheets

(56) References Cited

U.S. PATENT DOCUMENTS

| | | | |
|---|---|---|---|
| 6,273,771 B1 | 8/2001 | Buckley et al. | |
| 6,377,888 B1* | 4/2002 | Olch | G01C 21/165 |
| | | | 180/167 |
| 6,677,889 B2 | 1/2004 | Van Rees et al. | |
| 6,707,414 B2 | 3/2004 | Van Rees et al. | |
| 6,978,729 B2 | 12/2005 | Bertetti et al. | |
| 7,267,068 B2 | 9/2007 | Bradley et al. | |
| 7,305,928 B2 | 12/2007 | Bradley et al. | |
| 7,389,735 B2 | 6/2008 | Kaji et al. | |
| 7,561,886 B1 | 7/2009 | Gonring et al. | |
| 7,813,844 B2 | 10/2010 | Gensler | |
| 7,876,430 B2 | 1/2011 | Montgomery | |
| 8,031,086 B2* | 10/2011 | Thacher | G01S 13/825 |
| | | | 340/989 |
| 8,155,811 B2* | 4/2012 | Noffsinger | B61L 3/006 |
| | | | 701/21 |
| 8,622,778 B2 | 1/2014 | Tyers et al. | |
| 8,777,681 B1 | 7/2014 | McNalley et al. | |
| 8,797,141 B2 | 8/2014 | Best et al. | |
| 8,807,059 B1 | 8/2014 | Samples et al. | |
| 8,842,002 B2* | 9/2014 | Rado | G01S 5/0294 |
| | | | 340/539.1 |
| 8,924,054 B1 | 12/2014 | Arbuckle et al. | |
| 9,114,865 B1 | 8/2015 | Gonring | |
| 9,132,903 B1 | 9/2015 | Gable et al. | |
| 9,176,215 B2 | 11/2015 | Nikitin et al. | |
| 9,227,474 B2* | 1/2016 | Liu | B60D 1/245 |
| 2004/0222902 A1* | 11/2004 | Wortsmith | B63B 49/00 |
| | | | 340/932.2 |
| 2007/0113769 A1* | 5/2007 | Stallings | B63H 21/213 |
| | | | 114/144 R |
| 2010/0023192 A1* | 1/2010 | Rae | B63H 11/107 |
| | | | 701/21 |
| 2011/0022316 A1* | 1/2011 | Bendito Vallori | B63H 21/22 |
| | | | 701/301 |
| 2012/0129410 A1 | 5/2012 | Tyers | |
| 2012/0277941 A1* | 11/2012 | Noffsinger | B63B 49/00 |
| | | | 701/21 |
| 2013/0080044 A1 | 3/2013 | Tyers et al. | |
| 2015/0346722 A1 | 12/2015 | Herz et al. | |
| 2017/0253314 A1* | 9/2017 | Ward | B63H 25/42 |

FOREIGN PATENT DOCUMENTS

| | | |
|---|---|---|
| JP | 2008201225 A | 9/2008 |
| JP | 2011128943 A | 6/2011 |
| KR | 20060072293 A | 6/2006 |

OTHER PUBLICATIONS

Ward, Aaron, "Methods for Controlling Movement of a Marine Vessel Near an Object," Unpublished U.S. Appl. No. 15/246,681, filed Aug. 25, 2016.

Trolley Scan (Pty) Ltd, "RFID-Radar—How it Works," web article, web page accessed Oct. 3, 2016, available at http://www.rfidradar.com/howworks.html.

Open CV, "Detection of ArUco Markers," web article, Dec. 18, 2015, web page last accessed Nov. 29, 2016, available at http://docs.opencv.org/3.1.0/d5/dae/tutorial_aruco_detection.html.

* cited by examiner

SYSTEMS AND METHODS FOR AUTOMATICALLY TRAILERING A MARINE VESSEL ON A BOAT TRAILER

FIELD

The present disclosure relates to systems and methods for controlling movement of a marine vessel.

BACKGROUND

U.S. Pat. No. 6,273,771, which is hereby incorporated by reference in entirety, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068, which is hereby incorporated by reference in entirety, discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928, which is hereby incorporated by reference in entirety, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,561,886, which is hereby incorporated by reference in entirety, discloses a method by which a position of a marine vessel can be determined relative to a stationary object, such as a dock. Two position sensors are attached to a marine vessel and a microprocessor, onboard the marine vessel, computes various distances and angular relationships between the position sensors on the marine vessel and stationary transponders attached to the fixed device, such as a dock. The various dimensions and angular relationships allow a complete determination regarding the location and attitude of a marine vessel relative to the dock. This information can then be used by a maneuvering program to cause the marine vessel to be berthed at a position proximate the dock.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for automatically trailering a marine vessel includes a set of coded tags coupled to a boat trailer, each coded tag storing data regarding its location on the trailer. A tag reader is located aboard the marine vessel, the tag reader estimating a first distance between the tag reader and a first coded tag in the set of coded tags and estimating a second distance between the tag reader and a second coded tag in the set of coded tags. A position determination module uses the first and second estimated distances to determine a position and a heading of the marine vessel and a position and a heading of the trailer in a given coordinate system. A feedback control module calculates a difference between the position of the marine vessel and the position of the trailer and a difference between the heading of the marine vessel and the heading of the trailer and determines marine vessel movements required to minimize the position difference and the heading difference. A marine propulsion system automatically actuates a marine propulsion device to produce the required marine vessel movements and thereby propels the marine vessel onto the trailer.

According to another example of the present disclosure, a method for automatically trailering a marine vessel is disclosed. The method includes receiving an operator selection of a trailering mode that automatically trailers the marine vessel on a boat trailer. Next, the method includes reading signals from a set of radio-frequency identification (RFID) tags coupled to the trailer with an RFID receiver, each RFID tag storing data regarding its location on the trailer. The signals are used to estimate a first distance between the RFID receiver and a first RFID tag in the set of RFID tags and to estimate a second distance between the RFID receiver and a second RFID tag in the set of RFID tags. The first and second estimated distances are used to determine a position and a heading of the marine vessel and a position and a heading of the trailer in a given coordinate system. The method includes calculating a difference between the position of the marine vessel and the position of the trailer and a difference between the heading of the marine vessel and the heading of the trailer. The method also includes determining marine vessel movements required to minimize the position difference and the heading difference. The required marine vessel movements are output to a marine propulsion system that thereafter actuates a marine propulsion device to propel the marine vessel onto the trailer without further intervention from an operator of the marine vessel.

BRIEF DESCRIPTION OF DRAWINGS

Examples of systems and methods for automatically trailering a marine vessel are described with reference to the following Figures. The same numbers are used throughout the Figures to reference like features and like components.

DETAILED DESCRIPTION OF DRAWINGS

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC §112(f), only if the terms "means for" or "step for" are explicitly recited in the respective limitation.

Figure 1:
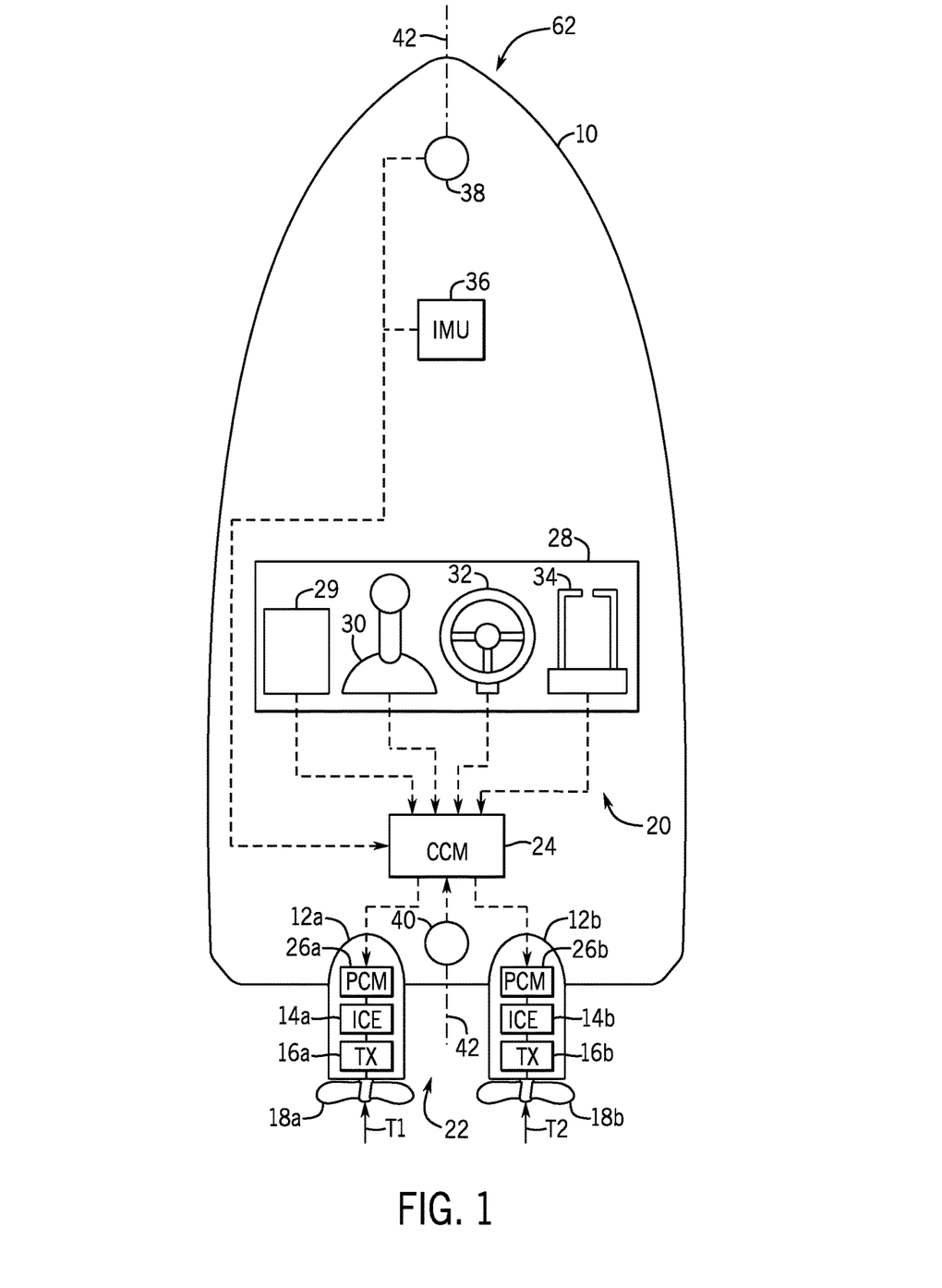
FIG. 1 is a schematic representation of a control system on a marine vessel.

FIG. 1 shows a marine vessel 10. The marine vessel 10 is capable of operating, for example, in a normal operating mode, a waypoint tracking mode, an auto heading mode, a station keeping mode, a joysticking mode, and an automatic trailering mode, among other modes, some of which are described herein below. The marine vessel 10 has first and second propulsion devices 12a, 12b that produce first and second thrusts T1, T2 to propel the marine vessel 10. As illustrated, the first and second propulsion devices 12a, 12b are outboard motors, but they could alternatively be inboard motors, stern drives, pod drives, or the like. Fewer or more than two propulsions devices 12a, 12b could be provided on the marine vessel 10. Each propulsion device 12a, 12b shown is provided with an internal combustion engine 14a, 14b operatively connected to a transmission 16a, 16b, in turn operatively connected to a propeller 18a, 18b.

FIG. 1 also shows a schematic of a control system 20 associated with the marine vessel 10. The control system 20 includes a control module, which is programmable and includes a processor and a memory. Here, the control module is a command control module (CCM) 24 located aboard the marine vessel 10. Note that the control module could, however, be located anywhere in the control system 20 and/or located remote from the control system 20 and can communicate with various components of the marine vessel 10 via a peripheral interface and wired and/or wireless links. Portions of the method disclosed herein below can be carried out by a single control module or by several separate control modules. For example, the control system 20 can have control module(s) located at or near a helm of the marine vessel 10, such as the CCM 24, and can also have control module(s) located at or near the propulsion devices 12a, 12b, such as propulsion control modules (PCMs) 26a, 26b. If more than one control module is provided, each can control operation of a specific device or sub-system on the marine vessel. For example, in the present example of the control system 20, one CCM 24 is provided for the entire system 20, and the additional PCMs 26a, 26b are provided for controlling each propulsion devices' functions, respectively. In another example, separate control modules are provided for controlling engine speed and functions apart from steering and trim of the propulsion devices 12a, 12b. For example, the PCMs 26a, 26b may control the engines 14a, 14b and transmissions 16a, 16b of the propulsion devices 12a, 12b, while additional thrust vector modules (TVMs) may control their orientation. Together, the PCMs 26a, 26b, the engines 14a, 14b, the transmissions 16a, 16b, the propellers 18a, 18b, their associated actuators, and any other control modules on the marine propulsion devices 12a, 12b make up a marine propulsion system 22 of the marine vessel 10.

In some examples, the control modules 24, 26a, 26b may include a computing system that includes a processing system, storage system, software, and input/output (I/O) interfaces for communicating with peripheral devices. The systems may be implemented in hardware and/or software that carries out a programmed set of instructions. For example, the processing system loads and executes software from the storage system, such as software programmed with an automatic trailering method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software program modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module communicates with one or more components of the control system via the I/O interfaces and a communication link, which can be a wired or wireless link. The control module is capable of monitoring and controlling one or more operational characteristics of the control system and its various subsystems by sending and receiving control signals via the communication link. In one example, the communication link is a serially wired controller area network (CAN) bus, as described in U.S. Pat. No. 6,273,771, but other types of links could be used. It should be noted that the extent of connections of the communication link shown herein is for schematic purposes only, and not every connection is shown in the drawing for purposes of clarity.

The control modules 24, 26a, 26b functionally convert input signals, such as but not limited to vessel control signals or input from sensors, to output signals, such as but not limited to actuator control signals, according to the computer executable instructions. Each of the input signals can be split into more than one branch, depending on how many functions are to be carried out and/or how many actuators are to be controlled with each of the input signals. The input signals may be fed to several software modules within the control modules through branch signals. The exact signals input into the software modules can be taken directly from the corresponding control input device or sensor, or could be pre-processed in some way, for example by scaling through an amplifier or by converting to or from a digital signal or an analog signal using a digital-to-analog or an analog-to-digital converter. It should be appreciated that more than one input signal can be combined to provide an output signal, in which case the individual input signals may be input to the same software modules or may each be provided to an individual software module. Note that in the event that more than one signal is used to generate an output signal, a post-processing module, such as a summer, a selector, or an averaging module is used to combine the input signals into an output signal.

The provided description of the control modules is conceptual and should be interpreted generally, as those skilled in the art will recognize many ways to implement such control modules. These include implementation using a digital microprocessor that receives input signals or branch signals and performs a calculation using the input signals to produce the corresponding output signals or actuator control signals. Also, analog computers may be used, which comprise circuit elements arranged to produce the desired outputs.

The marine vessel 10 also includes various other elements that make up part of the control system 20. The control system 20 comprises an operation console 28 in signal communication with the CCM 24. The operation console 28 includes a number of user input devices, such as an input pad 29, a joystick 30, a steering wheel 32, and one or more throttle/shift levers 34. Each of these devices inputs commands to the CCM 24. The CCM 24 in turn communicates with the first and second propulsion devices 12a, 12b by communicating with the PCMs 26a, 26b. The CCM 24 also receives information from a GPS-enabled inertial measurement unit (IMU) 36, including a GPS receiver located at a pre-selected fixed position on the marine vessel 10, which provides information related to the global position of the marine vessel 10. Signals from the GPS-enabled IMU 36 are provided to the CCM 24. In one example, the GPS-enabled IMU 36 includes a 3-axis gyrometer, a 3-axis accelerometer, and a 3-axis magnetometer that detects the direction of the Earth's magnetic field and indicates the marine vessel's heading relative to magnetic North (although it can be corrected to true North).

The steering wheel 32 and the throttle/shift levers 34 function in the conventional manner, such that rotation of the steering wheel 32 for example activates a transducer that provides a signal to the CCM 24 regarding a desired direction of the marine vessel 10. The CCM 24 in turn sends signals to the PCMs 26a, 26b, which in turn activate steering actuators to achieve desired orientations of the propulsion devices 12a, 12b, which are independently steerable about their steering axes. The throttle/shift levers 34 send signals to the CCM 24 regarding the desired gear (forward, reverse, or neutral) of the transmissions 16a, 16b and the desired rotational speed of the engines 14a, 14b. The CCM 24 in turn sends signals to the PCMs 26a, 26b, which in turn activate electromechanical actuators in the transmissions 16a, 16b and engines 14a, 14b for shift and throttle, respectively. The joystick 30 can also be used to allow the operator of the marine vessel 10 to manually maneuver the marine vessel 10, such as to achieve translation or rotation of the marine vessel 10. The input pad 29 can be a button, a keypad, a touch screen, a combination of a keypad and display screen, or another type of input device that allows an operator of the marine vessel 10 to select a particular function or mode for the control system 20.

As known to those having ordinary skill in the art, in a joysticking mode, the user may operate the joystick 30 to command the rotational and/or translational movements of the marine vessel, such as described in U.S. Pat. No. 7,267,068. Alternatively, the operator could operate the marine vessel 10 in a waypoint tracking mode, in which the marine vessel 10 is propelled from one waypoint (geographical coordinate) to another at a heading calculated to reach the desired waypoint. Another option is to operate the marine vessel 10 in a station keeping mode, in which the marine vessel 10 is maintained at a selected global position and a selected heading, such as described in U.S. Pat. No. 7,305,928. It is generally understood, according to these methods, that in order to obtain the desired heading and position of the vessel 10, the CCM 24 must have comparative information regarding the desired heading and the actual heading of the vessel and comparative information regarding the desired position and the actual position of the vessel. The CCM 24 compares the actual heading and the actual position of the vessel 10 detected by, for example, the GPS-enabled IMU 36, with the desired heading and the desired position. If the difference between the desired heading and the actual heading or the difference between the desired position and the actual position exceeds a threshold (which may be minimal), the CCM 24 may rotate the propulsion devices 12a, 12b and/or change the magnitude and/or direction of thrust provided by the propulsion devices 12a, 12b in order to achieve the desired heading and position values. For example, the CCM 24 can send a signal to the PCMs 26a, 26b to set angles of rotation of the first and second propulsion devices 12a, 12b with respect to the marine vessel 10, to set engine speed, and/or to set shift position based on the required movement of the vessel 10 to achieve the desired heading and position. The rotation, gear, and thrust magnitude of one propulsion device 12a can be varied independently of the rotation, gear, and thrust magnitude of the other propulsion device 12b.

Virtually any type of desired movement of the marine vessel 10 can therefore be accomplished by rotating the propulsion devices 12a, 12b, adjusting their thrusts, and placing them in a desired gear. The above-noted patents describe a maneuvering algorithm in which producing thrust vectors T1, T2 with the propulsion devices 12a, 12b, which thrust vectors T1, T2 resolve into desired X components and Y components, causes the vessel 10 to achieve lateral movement, rotational movement, or a combination of the two. Such a maneuvering algorithm is used in response to commands from the joystick 30 while in joysticking mode, while the vessel 10 operates in the station keeping mode, and in other modes that require joystick-like responses from the marine propulsion system 22. According to the present disclosure, the same or a similar maneuvering algorithm can be used to automatically trailer a marine vessel 10 on a boat trailer in response to selection of an automatic trailering mode of the marine propulsion system 22. For purposes of carrying out such an automatic trailering mode, one or more tag readers, such as radio-frequency identification (RFID) receivers 38, 40 and/or camera 72 (FIG. 2), may be provided aboard the marine vessel 10, such as for example along a longitudinal centerline 42 of the marine vessel 10 that divides the marine vessel 10 into two lateral halves.

Figure 2:
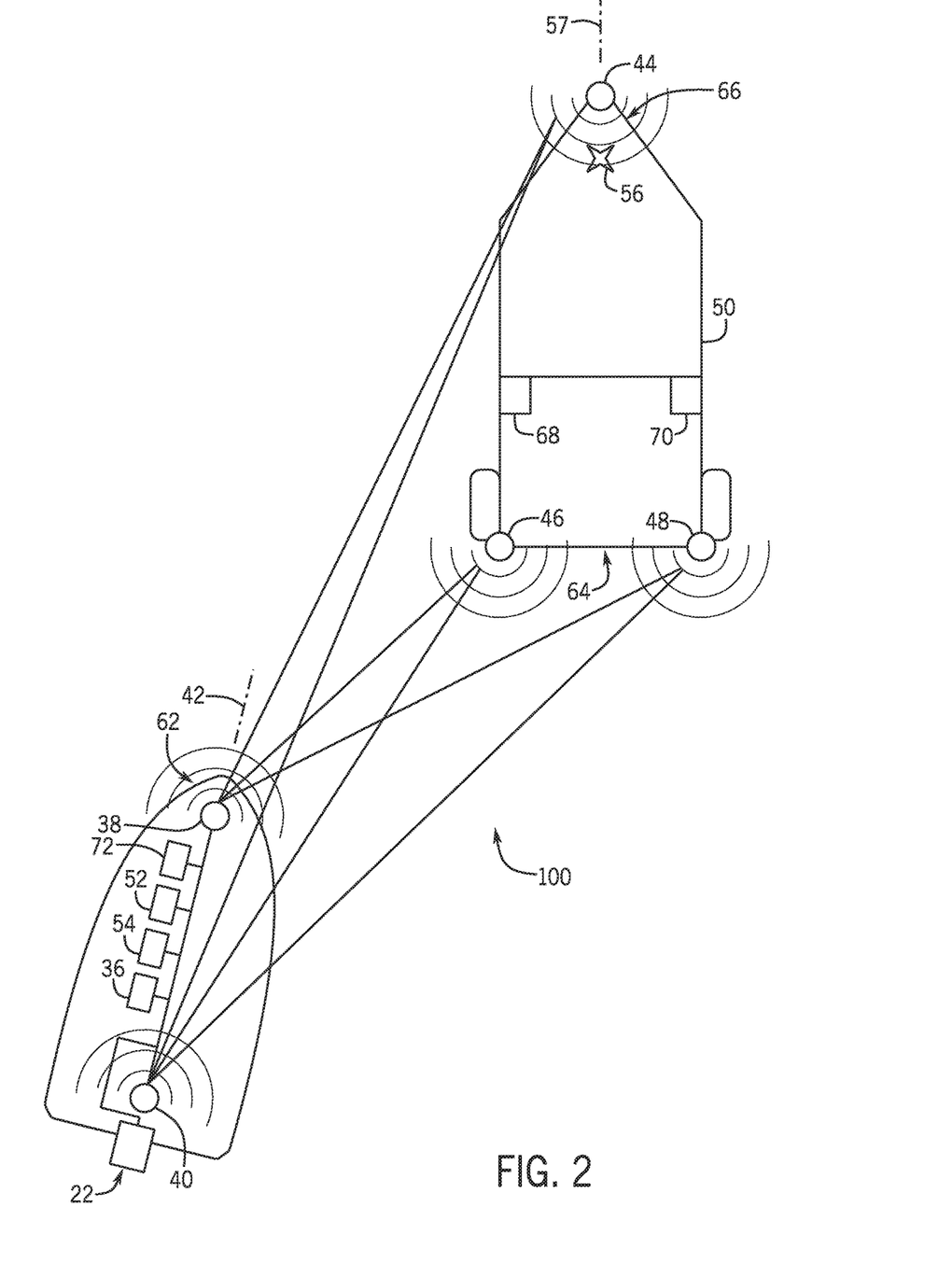
FIG. 2 is a schematic representation of a system for automatically trailering a marine vessel on a boat trailer.

Turning to FIG. 2, the RFID receivers 38, 40 may be configured to communicate with a set of coded tags (more specifically RFID tags 44, 46, 48) coupled to a boat trailer 50, as shown by the communication lines between both RFID receivers 38, 40 and each RFID tag 44, 46, 48, in order to provide an automatic trailering system 100 for the marine vessel 10. The RFID tags 44, 46, 48 may be passive, active, or battery-assisted passive, and the receivers 38, 40 may correspondingly be Passive Reader Active Tag, Active Reader Passive Tag, or Active Reader Active Tag units.

Each RFID tag 44, 46, 48 stores data, such as in an N-bit string, as will be described below. The first and/or second n bits of the N bits of stored data can contain certain identification information that matches identification information stored in the RFID receivers, 38, 40 such that the marine vessel 10 can be trailered on the correct trailer 50. Of course, other RFID tags besides those on the trailer 50 of interest may be present in the area, but it is desirable to communicate with those tags on the trailer 50 of interest in order to move the marine vessel 10 onto the trailer 50. Therefore, one or both of the RFID receivers 38, 40 may solicit replies from tags in response to a general query, and may narrow their queries by subsequently soliciting replies only from tags whose first n bits match a certain pattern. Other methods for determining which tags are to be used for trailering a particular marine vessel equipped with a particular RFID receiver are contemplated, and the above method is provided by way of example only.

Each RFID tag 44, 46, 48 may also store data regarding its location on the trailer 50, for example with respect to a local fixed coordinate system, as will be described further herein below. For example, the RFID tag 46 may have stored data indicating it is at the rear left corner of the trailer 50; the RFID tag 48 may have stored data indicating it is at the rear right corner of the trailer 50, and the RFID tag 44 may have stored data indicating it is at the front corner of the trailer 50. Note that the tags 44, 46, 48 may also store their angles with respect to one another and their distances with respect to one another.

In order to commence the trailering method of the present disclosure, the system 100 may include a user input device with which an operator of the marine vessel 10 may select an automatic trailering mode of the marine propulsion system 22. For example, the operator may select the automatic trailering mode via the input pad 29. Such selection may cause the RFID receivers 38, 40 to send out a query to any nearby RFID tags to determine if trailering is possible. Whether trailering is possible may depend on how far the vessel 10 is from the trailer 50. For example, in response to selection of the automatic trailering mode, the marine propulsion system 22 will not trailer the marine vessel 10 unless the RFID receiver 38 or 40 determines that the RFID receiver 38 or 40 is within a given distance of at least one RFID tag in the set of RFID tags 44, 46, 48. If an RFID tag 44, 46, or 48 having first n bits that match those the RFID receiver 38 or 40 is looking for is within the given distance of the RFID receiver 38 or 40, the trailering method will then continue to the next step. In one example, the given distance is 50 feet, although other distances could be chosen by the manufacturer or the marine vessel operator.

Once the RFID receivers 38 and/or 40 have narrowed their queries to the RFID tags on the trailer 50 of interest, each RFID receiver 38, 40, located aboard the marine vessel 10, can estimate a first distance between the RFID receiver 38 or 40 and a first RFID tag 44 in the set of RFID tags and can estimate a second distance between the RFID receiver 38 or 40 and a second RFID tag 46 in the set of RFID tags. Similarly, the RFID receiver 38 or 40 can estimate a distance between the RFID receiver 38 or 40 and a third RFID tag 48 in the set of RFID tags. In other examples, to be described below, only one RFID receiver 38 or 40 is provided aboard the marine vessel 10 and the one RFID receiver estimates the first distance between the RFID receiver and the first RFID tag in the set of RFID tags and estimates the second distance between the RFID receiver and the second RFID tag in the set of RFID tags. In one example, the RFID receiver(s) 38 and/or 40 estimate such distances by measuring return signal strength or a function of returned signal strength from the RFID tags, such as by using a returned signal strength indicator (RSSI).

The system 100 also includes a position determination module 52 that uses the first and second estimated distances to determine a position and a heading of the marine vessel 10 and a position and a heading of the trailer 50 in a given coordinate system. The given coordinate system may be a local coordinate system defined by the data stored on the RFID tags or may be the Earth's global coordinate system, depending on the position determination algorithm and the hardware provided on the marine vessel 10. Note that although the trailer 50 is not moving, its "heading" with respect to the given coordinate system is the angle of its longitudinal centerline 57 from North or a y-axis, as will be described herein below. The position of the RFID receiver 38 or 40 can be estimated from an average or from a weighted average of known positions of the RFID tags 44, 46, 48 (recall, these positions, at least with respect to a local coordinate system, are stored on the tags). The received signal strength or a function of received signal strength may determine the weighting factors, which can be normalized before being applied to the position calculation. In another example, received signal strength may be used to estimate the distance to several tags and the receiver's position can then be estimated using trilateration or multilateration, potentially using a least squares approach. The position determination module 52 is shown in FIG. 2 as a separate module, but could be part of the RFID receiver 38 or 40 or could be part of the CCM 24. In the example in which the position determination module 52 is part of the RFID receiver 38 or 40, the RFID receiver 38 or 40 can include a reader module 38a or 40a that communicates the first and second (and third, etc.) distances, determined for example by signal strength, to the position determination module 52 for processing thereof.

Each of the RFID tags 44, 46, 48; the RFID receivers 38, 40; and the position determination modules 52 (whether as parts of the RFID receivers 38, 40 or not) can be sold together as a kit that allows a boat owner to set up the automatic trailering system 100. For example, the RFID tags 44, 46, 48 can be provided on clips, adhesive strips, flags, or any other device that can be permanently or removably attached to the trailer 50. The RFID receivers 38, 40 can be provided in separate housings, with or without external antennae, and either permanently or removably attachable to the marine vessel 10 such as by way of attachment brackets, adhesives, fasteners, or other attachment devices. Although the number of RFID tags provided in the kit and required to be installed on the trailer 50 to operate the system 100 may vary, the more RFID tags from which the RFID receivers can estimate their position, within reason to reduce noisiness, the more accurate the position calculation will be.

Still referring to FIG. 2, the trailering system 100 also includes a feedback control module 54 that calculates a difference between the position of the marine vessel 10 and the position of the trailer 50 and a difference between the heading of the marine vessel 10 and the heading of the trailer 50 and determines marine vessel movements required to minimize the position difference and the heading difference. The feedback control module 54, although shown as a separate module in FIG. 2, can be part of the CCM 24. The feedback control module 54 can be, for example, a PID feedback controller that outputs proportional, integral, and derivative control terms to minimize the differences between the position and heading of the marine vessel 10 and the position and heading of the trailer 50. The system 100 also includes the marine propulsion system 22, which is in communication with the feedback control module 54, and which automatically actuates a marine propulsion device (e.g. 12a and/or 12b) to produce the required marine vessel movements and thereby propels the marine vessel 10 onto the trailer 50.

Details of the example algorithms that can be carried out by the position determination module 52 and the feedback control module 54 will be discussed with respect to FIGS. 3 and 4.

Figure 3:
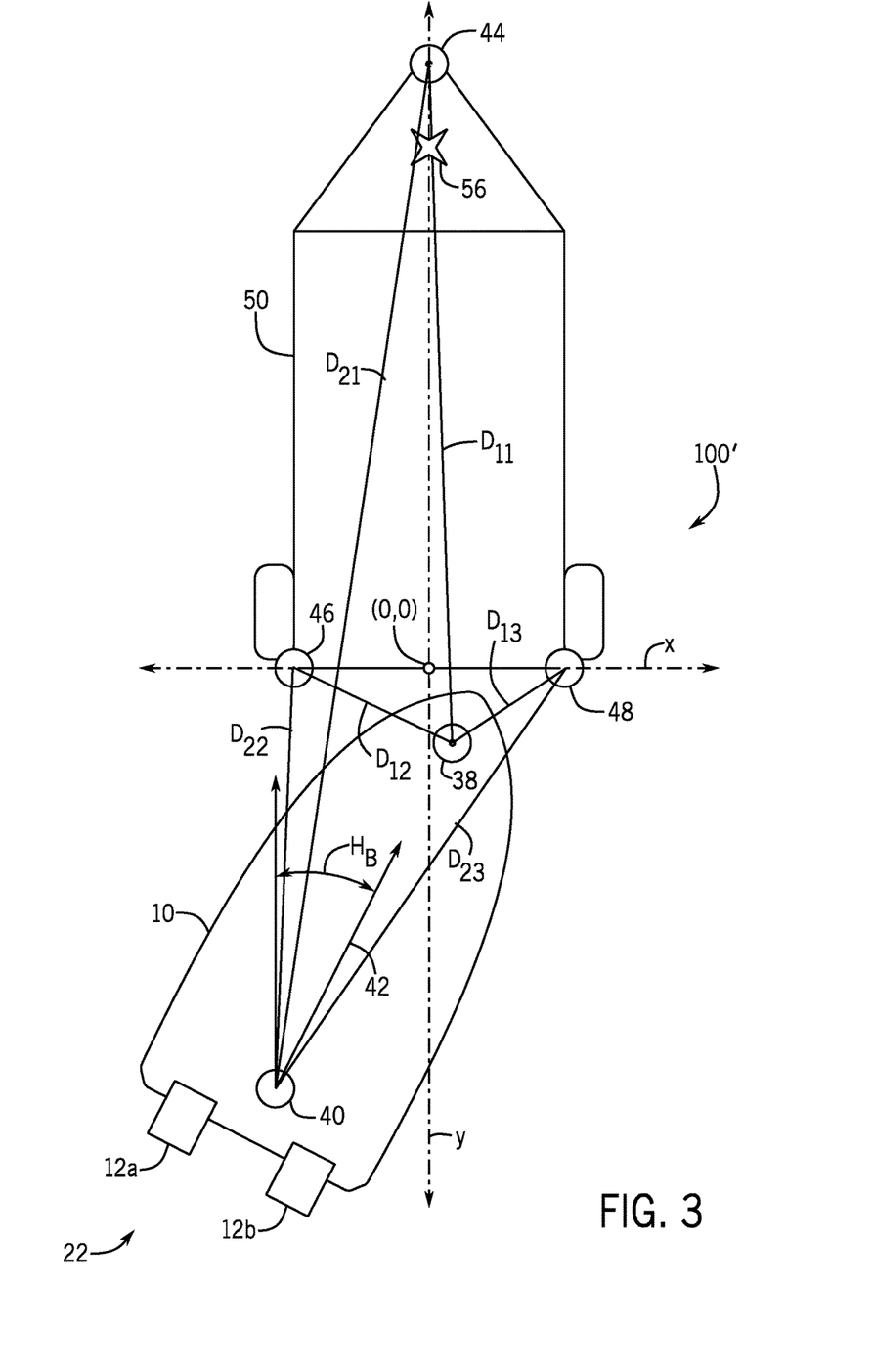
FIG. 3 is used to illustrate a system and algorithm for determining required marine vessel movements to trailer the marine vessel on the boat trailer.

FIG. 3 shows a trailering system 100' in which, similar to FIG. 2, two RFID receivers 38, 40 are located along a longitudinal centerline 42 of the marine vessel 10. As noted herein above, each RFID receiver 38, 40 estimates the first distance between the respective RFID receiver 38 or 40 and the first RFID tag 44 and the second distance between the respective RFID receiver 38 or 40 and the second RFID tag 46. More specifically, first RFID receiver 38 estimates first distance $D_{11}$ between first RFID receiver 38 and first RFID tag 44. Second RFID receiver 40 estimates first distance $D_{21}$ between the second RFID receiver 40 and the first RFID tag 44. First RFID receiver 38 also estimates second distance $D_{12}$ between first RFID receiver 38 and second RFID tag 46. Second RFID receiver 40 also estimates second distance $D_{22}$ between second RFID receiver 40 and second RFID tag 46. Estimates can similarly be determined for distances $D_{13}$ and $D_{23}$ between the first and second receivers 38, 40 and the third RFID tag 48. Note that each of the RFID tags 44, 46, 48 could be placed elsewhere than shown, and that although a minimum of two RFID tags is needed to obtain comparative information for purposes of position calculations, more RFID tags could be provided. Note that a GPS-enabled IMU 36 could also be provided as part of the system 100', but is not shown herein for purposes of clarity of the drawing.

As noted above, the RFID tags 44, 46, 48 have stored data that indicates their position on the trailer 50. In addition to the data indicating what corner or area of the trailer 50 the RFID tag is attached to, the data may also indicate the relative positioning of the tags in a fixed local coordinate system. For exemplary purposes, the coordinate system may be a 2-D system with x and y axes and an origin (x, y)=(0, 0) at the middle of the back end of the trailer 50, as shown in FIG. 3. Each RFID tag 44, 46, 48 stores data regarding its location on the trailer 50 in relation to the local coordinate system. For example, for an 8-foot wide by 16-foot long trailer 50, tag 44 stores a position of (0, 16); tag 46 stores a position of (−4, 0); and tag 48 stores a position of (4, 0). Other points could be chosen as the origin and the local coordinates of the tags stored accordingly. Such information can be stored on the tags by the manufacturer, if the trailer 50 comes with the tags 44, 46, 48 pre-installed, or by the trailer owner, if the tags are installed as part of an aftermarket kit.

Also as noted above, the RFID receivers 38, 40 can use returned signal strength to estimate the distances $D_{11}$, $D_{12}$, $D_{21}$, $D_{22}$, $D_{13}$, $D_{23}$. Given these distances, the position determination module 52 determines the position and the heading of the marine vessel 10 with respect to the local x, y coordinate system. First, the position determination module 52 can solve for the local coordinates of the first and second RFID receivers 38, 40, such as for example using weighted averages of the estimated distances or using trilateration. Once the local coordinates of the receivers 38, 40 have been estimated, the position determination module 52 can use simple geometry to determine the heading of the marine vessel 10 with respect to the local coordinate system. For example, if the coordinates of receiver 38 are determined to be (x1, y1) and the coordinates of receiver 40 (x2, y2), the position determination module 52 can determine the heading $H_B$ with respect to the y-axis of the localized coordinate system using the following equation:

$$H_B = \tan^{-1} \frac{x1 - x2}{y1 - y2}$$

The feedback control module 54 can next calculate a difference between the position of the marine vessel 10 and the position of the trailer 50 and a difference between the heading of the marine vessel 10 and the heading of the trailer 50. For example, the feedback control module 54 can be provided with a target location 56 on the trailer 50 at which a preselected point on the marine vessel 10 is to be positioned. For example, assuming the preselected point on the marine vessel 10 is coincident with the first RFID receiver 38 and the target location 56 on the trailer has the coordinates (0, 12), the feedback control module 54 may determine that the marine vessel 10 needs to move −x1 feet (i.e., x1 feet to the left) and 12−y1 feet (i.e., 12−y1 feet forward) in order for the preselected point on the marine vessel 10 to reach the target location 56 on the trailer 50. The feedback control module 54 may determine the heading difference by subtracting the calculated localized heading $H_B$ of the marine vessel 10 from the localized heading of the trailer 50, which is its centerline 57 (FIG. 2) orientation with respect to the y-axis of the local coordinate system (here, 0 degrees). Thus, the feedback control module 54 would determine that the marine vessel 10 needs to rotate $-H_B$ degrees (or $H_B$ degrees counterclockwise) to match the heading of the trailer 50. Note that in other examples, the target location 56 may be at the location of an RFID tag, such as RFID tag 44, and the preselected point on the vessel 10 need not be at the location of RFID receiver 38.

Figure 4:
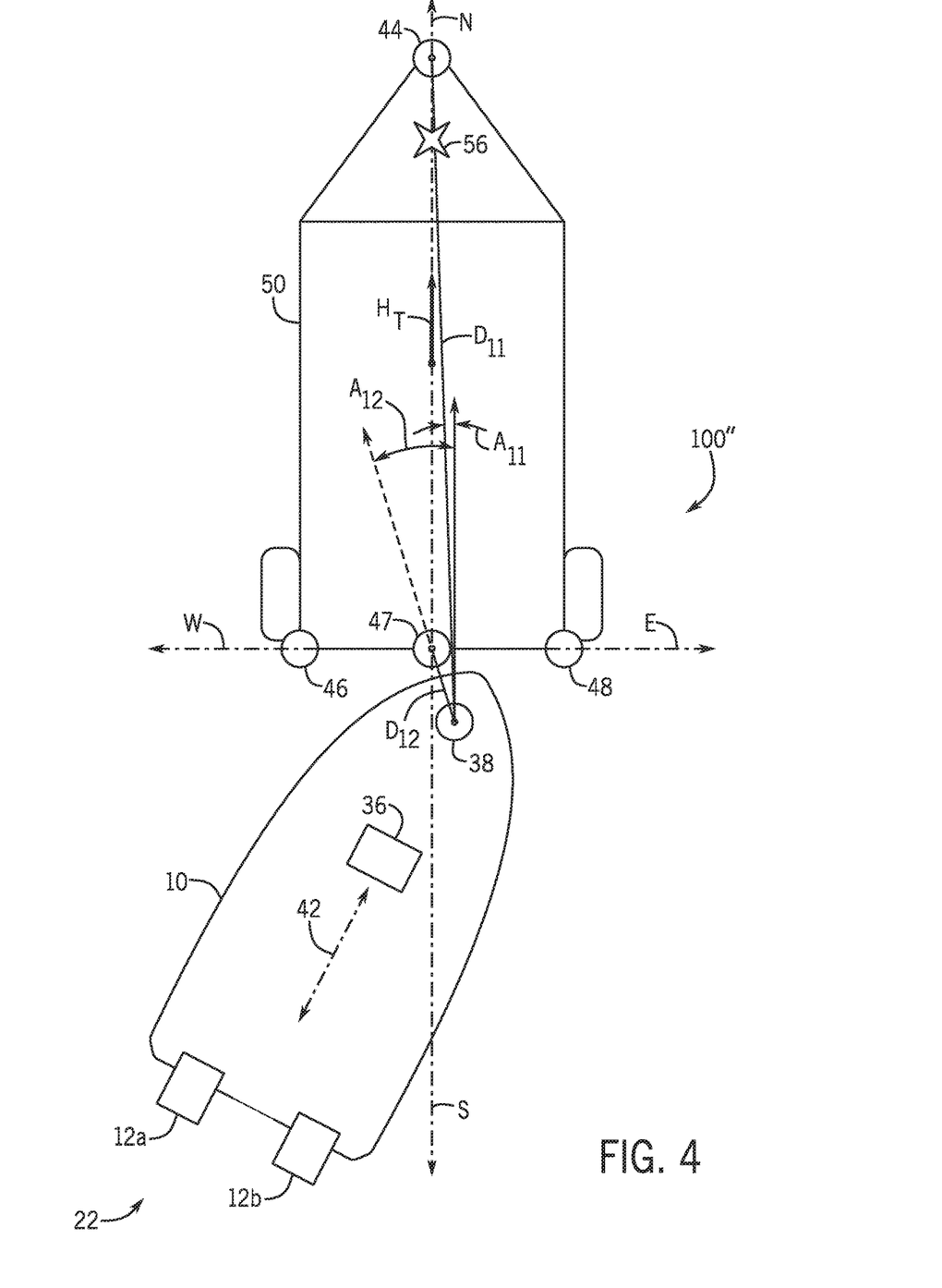
FIG. 4 is used to illustrate another system and algorithm for determining required marine vessel movements to trailer the marine vessel on the boat trailer.

FIG. 4 illustrates an example of a trailering system 100" in which only one RFID receiver 38 is located aboard the marine vessel 10. Again, the RFID receiver 38 can be positioned along the longitudinal centerline 42 of the vessel 10. Note that the RFID receiver 38 does not need to be positioned near the bow of the vessel 10, as shown herein, but instead could be positioned further back along the centerline 42, such as receiver 40 in FIGS. 2 and 3. Additionally, the receiver 38 need not be positioned along the longitudinal centerline 42, but if it is not, the position determination module 52 and feedback control module 54 are programmed to account for its offset placement in their calculations. In the example of FIG. 4, the RFID receiver 38 is of a type that also estimates a first angle between the RFID receiver 38 and a first RFID tag 44 and estimates a second angle between the RFID receiver 38 and a second RFID tag 47. For ease of explanation, a second tag 47 having a location different than that of second tag 46 in FIGS. 2 and 3 is used herein, but it should be understood that any of the tags 44, 46, 47, 48 could be the first or second tag, so long as the modules 52, 54 are programmed to take the tags' locations with respect to one another into account. For example, only the tags 46 and 48 could be attached to the trailer 50, and a trailer profile, including the trailer's length, could be entered by the manufacturer or end user. (Note that this applies to the system 100' of FIG. 3 as well.) In the example of FIG. 4, the RFID receiver 38 estimates a first distance $D_{11}$ and a first angle $A_{11}$ between the RFID receiver 38 and a first RFID tag 44 in the set of RFID tags and estimates a second distance $D_{12}$ and a second angle $A_{12}$ between the RFID receiver 38 and a second RFID tag 47 in the set of RFID tags. Note that the angles here are shown as being measured from the North axis, but could be measured with respect to other orientations.

Note that the system 100" in FIG. 4 is shown as being in a NSEW global coordinate system and also includes a GPS-enabled inertial measurement unit (IMU) 36, as described herein above with respect to FIG. 2. The GPS-enabled IMU 36 provides global coordinates of a predetermined location on the marine vessel 10 in latitude and longitude and an absolute heading of the marine vessel 10 with respect to North to the position determination module 52. The predetermined location on the marine vessel 10 can be the location of the GPS-enabled IMU 36, the location of the RFID receiver 38, or another location. In this system, the position and heading of the marine vessel 10 is therefore determined from the information provided by the GPS-enabled IMU 36, where the position is the latitude and longitude of the predetermined location on the vessel 10 and the heading is the magnetometer heading value. In order to compare this information to the information available from the trailer 50, the locations of the RFID tags 44, 46, 47, 48 can be converted to the global coordinate system.

For instance, the position determination module 52 can determine an absolute heading of the trailer 50 with respect to North using the first and second estimated distances $D_{11}$, $D_{12}$, the first and second estimated angles $A_{11}$, $A_{12}$, and the absolute heading of the marine vessel 10 (i.e., heading value from the GPS-enabled IMU 36). Assuming that the preselected point on the vessel 10 is at the first RFID receiver 38, the first tag 44 is $D_{11}*\sin(A_{11})$ west of the preselected point and the first tag 44 is $D_{11}*\cos(A_{11})$ north of the preselected point. The second tag 47 is $D_{12}*\sin(A_{12})$ west of the preselected point the second tag 47 is $D_{12}*\cos(A_{12})$ north of the preselected point. The position determination module 52 can use this information about the tags 44 and 47 to determine the absolute heading of the trailer 50, i.e. its orientation along its centerline 57 (see FIG. 2), with respect to North. This heading $H_T$ can be calculated as:

$$H_T = \tan^{-1} \frac{(D_{11}*\sin(A_{11})) - (D_{12}*\sin(A_{12}))}{(D_{11}*\cos(A_{11})) - (D_{12}*\sin(A_{12}))}$$

The feedback control module 54 will then compare the measured absolute position of the preselected point on the vessel 10 to the calculated absolute position of the target location 56 on the trailer 50 (calculated based on a known distance of the target location 56 from the tag 44 or the tag 47, once the position determination module 52 has calculated the location of the tag 44 or the tag 47) to determine a difference therebetween. The feedback control module 54 will also calculate a difference between the measured absolute heading of the vessel 10 and the calculated absolute heading of the trailer 50.

After the feedback control module 54 determines the differences in position and heading, as noted, it determines the marine vessel movements required to minimize the position difference and the heading difference. The feedback control module 54 may be programmed to minimize the heading difference first, so as to align the centerline 42 of the marine vessel 10 parallel to the longitudinal centerline 57 of the trailer 50 (i.e., to yaw only), and then to minimize the position difference by moving the vessel 10 left or right to align the centerlines 42, 57 of the vessel 10 and the trailer 50 along the same line (i.e., to translate only), and then to minimize the position difference by propelling the vessel 10 forward into the trailer 50 (i.e., to translate only). Alternatively, the feedback control module 54 may choose to minimize both position and heading difference at the same time by moving the vessel 10 in an arc to align its centerline 42 with the centerline 57 of the trailer 50 (i.e., to yaw and translate), and then to propel the vessel 10 forward into the trailer 50 (i.e., to translate only). The feedback control module 54 may be able to command either type of positioning steps depending on the initial relative positions and headings of the vessel 10 and the trailer 50. The feedback control module 54 can then output the required marine vessel movements to the marine propulsion system 22, which can rotate the propulsion devices 12a, 12b, change their magnitude and direction of thrust, and/or shift the propulsion devices 12a, 12b into certain gears that will achieve the required vessel movements. Such maneuvering algorithms for minimizing position and heading differences are well known in the art (see, for example, U.S. Pat. Nos. 7,267,068 and 7,305,928) and will not be described further herein.

Figure 5:
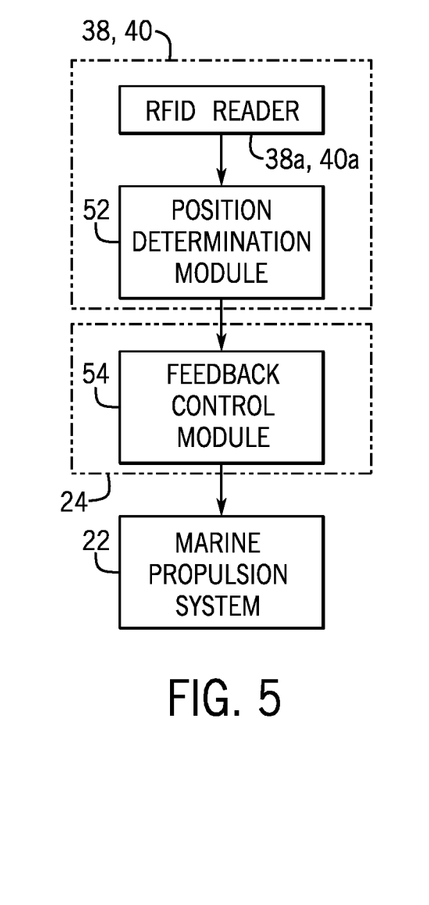
FIG. 5 shows an exemplary system for carrying out the algorithms of FIGS. 3 and 4.

As mentioned herein above, the present algorithms may be carried out within a single module or within many modules. Any of the modules could be a separate module or contained within another module. The number of modules may depend on whether the system is that of FIG. 3 or that of FIG. 4. The number of modules may also depend on whether the system is integrated as part of the marine vessel control system 20, or is added as an aftermarket feature. FIG. 5 shows an example in which the RFID receiver 38 or 40 contains both an RFID reader module 38a or 40a and the position determination module 52. The position determination module 52 is in communication with the feedback control module 54, which is provided separately as part of the CCM 24. For example, the feedback control module 54 may be the same feedback controller already installed for purposes of joysticking mode, waypoint tracking mode, and/or station keeping mode. The feedback control module 54 is in turn provided with communication to the marine propulsion system 22. The example of FIG. 5 would work well with the system 100' of FIG. 3 and/or when the system is provided as a pre-installed feature of the control system 20, because the position determination module 52 could provide the feedback control module 54 directly with the forward/reverse, left/right, and heading differences for minimization of those differences by actuation of the marine propulsion system 22. If the trailering system is as described with respect to FIG. 4, the CCM 24 may be provided with an algorithm for converting the north/south, east/west, and absolute heading differences into forward/reverse, left/right, and heading differences for use by the feedback control module 54.

Figure 6:
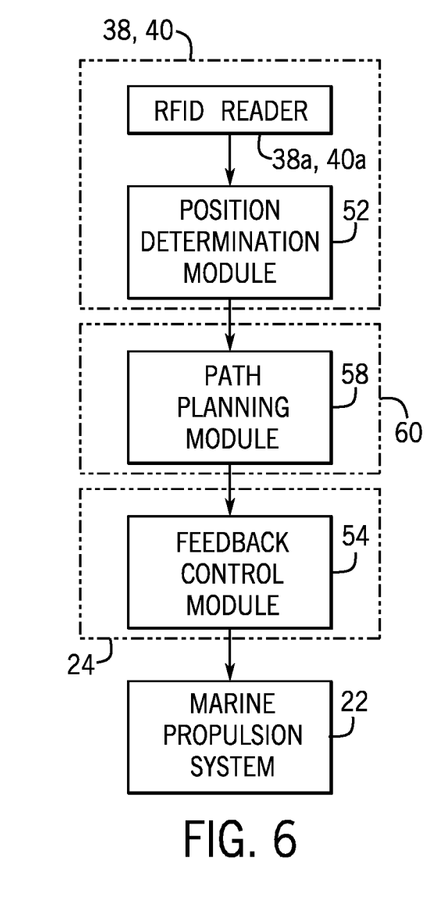
FIG. 6 shows another exemplary system for carrying out the algorithms of FIGS. 3 and 4.

FIG. 6 shows an example in which the RFID receiver 38 or 40 still contains both an RFID reader module 38a or 40a and the position determination module 52. However, the position determination module 52 here is in communication with a path planning module 58, which may be located in the same housing as the position determination module 52 or its own separate housing 60. The path planning module 58 may be used when, for example, the system is implemented as an aftermarket feature. The position determination module 52 can send the position of the marine vessel 10 and the position of the trailer 50 and the heading of the marine vessel 10 and the heading of the trailer 50 with respect to the local (x, y) coordinate system to the path planning module 58, which thereafter determines an absolute heading of the trailer 50 with respect to North and global coordinates of a target location 56 on the trailer 50 in latitude and longitude. (Note that this would require a determination by the GPS-enabled IMU 36 of the absolute position and heading of the vessel 10 beforehand.) The path planning module 58 can then send the absolute heading of the trailer 50 and the global coordinates of the target location 56 on the trailer 50 to the feedback control module 54, which determines and outputs the required marine vessel movements to the marine propulsion system 22. More specifically, the path planning module 58 can send the absolute heading of the trailer 50 and the global coordinates of the target location 56 on the trailer 50 to the CCM 24, which resolves them into forward/reverse, left/right, and heading differences for use by the feedback control module 54. This is helpful because the CCM 24 is already programmed to receive a target position and target heading when carrying out the station keeping and waypoint tracking features noted above, and no re-programming of the CCM 24 would therefore be required if the trailering feature were added as an aftermarket feature. The feedback control module 54 then determines and outputs the required marine vessel movements to the marine propulsion system 22, which actuates the propulsion devices 12a, 12b to realize those movements.

It should be noted that in either of the examples of FIGS. 5 and 6 the different modules can be combined with one another or separated from one another in ways other than those shown herein.

Figure 7:
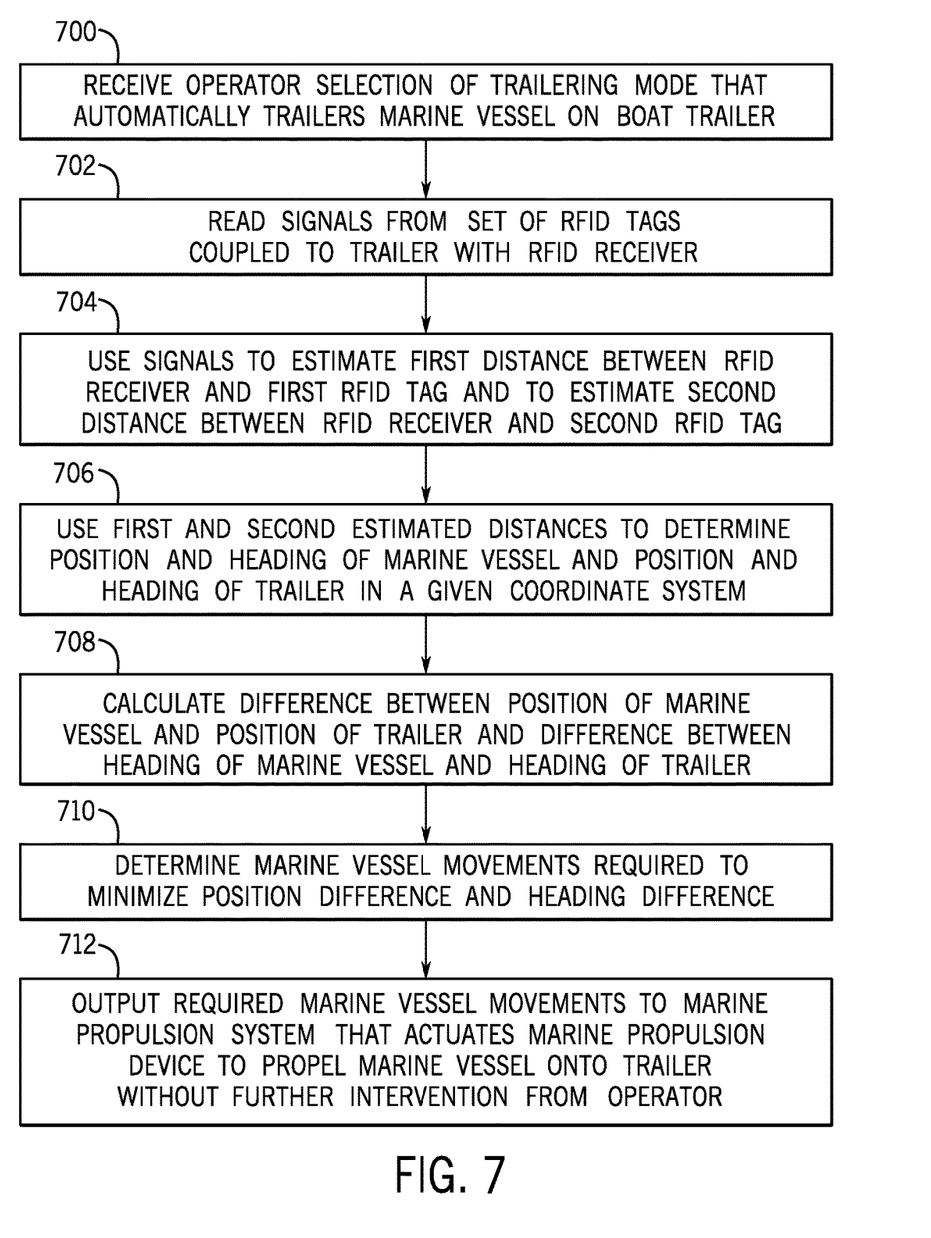
FIG. 7 illustrates one example of a method for automatically trailering a marine vessel according to the present disclosure.

FIG. 7 shows a method for automatically trailering a marine vessel 10. The method includes receiving an operator selection of a trailering mode that automatically trailers the marine vessel 10 on a boat trailer 50, as shown at 700. As noted above, this may be through selection of such a feature via an input pad 29. In one example, the operator must hold the trailering function selection button or key for longer than a predetermined period of time before the trailering function will be activated. Next, as shown at 702, the method includes reading signals from a set of RFID tags 44, 46, 47, 48 coupled to the trailer 50 with an RFID receiver 38 or 40, each RFID tag 44, 46, 47, 48 storing data regarding its location on the trailer 50. As shown at 704, the signals from the RFID tags 44, 46, 47, 48 are used to estimate a first distance between the RFID receiver 38 or 40 and a first RFID tag in the set of RFID tags 44, 46, 47, 48 and to estimate a second distance between the RFID receiver 38 or 40 and a second RFID tag in the set of RFID tags 44, 46, 47, 48. As noted above, the method may comprise automatically trailering the marine vessel 10 in response to selection of the trailering mode only if the RFID receiver 38 or 40 determines that the RFID receiver 38 or 40 is within a given distance of at least one RFID tag in the set of RFID tags 44, 46, 47, 48. In another example, there may be a water sensor on the trailer 50, such as at its back end 64 (FIG. 2) or near its middle, in signal communication with the RFID receiver 38 or 40 or the position determination module 52, which signals that the trailer 50 is in the water and therefore ready to receive the vessel 10. If the trailer 50 is not in the water, as determined by the water sensor, the trailering feature may not be carried out.

As shown at 706, the first and second estimated distances are used to determine a position and a heading of the marine vessel 10 and a position and a heading of the trailer 50 in a given coordinate system. In the case that the method includes (a) determining global coordinates of a predetermined location on the marine vessel 10 in latitude and longitude and an absolute heading of the marine vessel 10 with respect to North using a GPS-enabled IMU 36 and (b) estimating a first angle between the RFID receiver 38 or 40 and the first RFID tag and estimating a second angle between the RFID receiver 38 or 40 and the second RFID tag, the method may also include (1) determining an absolute heading of the trailer 50 with respect to North using the first and second estimated distances, the first and second estimated angles, and the absolute heading of the marine vessel 10; and (2) determining global coordinates of a target location 56 on the trailer 50 in latitude and longitude using the first and second estimated distances, the first and second estimated angles, and the global coordinates of the predetermined location on the marine vessel. See FIG. 4. In the instance where the method includes (a) estimating a first distance between a first RFID receiver 38 located along a longitudinal centerline 42 of the marine vessel 10 and the first RFID tag; (b) estimating a second distance between the first RFID receiver 38 and the second RFID tag; (c) estimating a first distance between a second RFID receiver 40 located along the longitudinal centerline 42 of the marine vessel 10 and the first RFID tag; and (d) estimating a second distance between the second RFID receiver 40 and the second RFID tag, the method may include determining the position and the heading of the marine vessel 10 with respect to a local (x, y) coordinate system defined by the data stored on the RFID tags 44, 46, 37, 48 using the first distances between the first and second RFID receivers and the first RFID tag, respectively, and the second distances between the first and second RFID receivers and the second RFID tag, respectively. See FIG. 3.

Returning to FIG. 7, as shown at 708, the method includes calculating a difference between the position of the marine vessel 10 (such as the position of a preselected point on the vessel 10) and the position of the trailer 50 (such as the location of a target 56) and a difference between the heading of the marine vessel 10 and the heading of the trailer 50. This can be done, for example, using a feedback control module 54. The method also includes determining marine vessel movements required to minimize the position difference and the heading difference, as shown at 710, which can also be done using the feedback control module 54. As shown at 712, the required marine vessel movements are output to a marine propulsion system 22 that thereafter actuates a marine propulsion device 12a and/or 12b to propel the marine vessel 10 onto the trailer 50 without further intervention from an operator of the marine vessel 10. The CCM 24 automatically controls the thrust produced by the propulsion system 22, which may vary in magnitude and/or direction along the path to the trailer 50 in order to counteract external factors such as wind, current, and the like so as to keep the vessel 10 on course.

Referring back to FIG. 2, in one example, the method includes automatically propelling the marine vessel 10 with a first predetermined thrust while trailering the marine vessel 10 until the RFID receiver 38 or 40 senses that a bow 62 of the marine vessel 10 has reached a predetermined position on the trailer 50. For example, the CCM 24 can command the propulsion system 22, by way of PCMs 26a, 26b, to open the throttles of the engines 14a, 14b to a particular angle and/or to provide fueling at a given rate. This will ensure that the vessel 10 is not approaching the trailer 50 at too quick a speed, and will allow the RFID receivers 38, 40 to determine if the vessel 10 is off course from reaching the target location 56 on the trailer 50. Once the bow 62 of the marine vessel 10 has reached the predetermined position on the trailer 50, the method may thereafter include automatically propelling the marine vessel 10 with a second predetermined thrust that is greater than the first predetermined thrust. This will make sure the vessel 10 is able to overcome the friction force of the trailer 50 and keep moving forward on the trailer 50. In one example, the predetermined position is a back end 64 of the trailer 50. In another example, the predetermined position may be a quarter of the way between the back end 64 and a front end 66 of the trailer 50. The predetermined position may instead be any other predetermined position on the trailer 50 at which higher friction force is expected. The method may also include automatically shifting the marine propulsion system 22 into neutral in response to the RFID receiver 38 or 40 sensing that the bow 62 of the marine vessel 10 has reached the front end 66 of the trailer 50. This may occur when the RFID receiver 38 senses it is just above the RFID tag 44. In another example, the propulsion system 22 may be commanded to shift into neutral when the predetermined point on the marine vessel 10 (e.g., the location of RFID receiver 38) reaches the target location 56 on the trailer 50. In another example, the propulsion system 22 may shift to neutral once the GPS-enabled IMU 36 determines that the vessel 10 is no longer moving forward in the trailer 50 due to the friction.

In another example, a set of ArUco markers 68, 70 may be coupled to the trailer 50, and a camera 72 (or more than one camera) may be located aboard the marine vessel 10, for example along its centerline 42, and in signal communication with the position determination module 52. The ArUco markers 68, 70 serve as the coded tags in lieu of the above-described RFID tags. The ArUco markers may be provided at the locations shown in FIG. 2, or may be provided at the locations of the RFID tags. In either case, the ArUco markers 68, 70 are coded with appropriate information regarding their location on the trailer 50, and the position determination module 52 uses information regarding the positions of the ArUco markers 68, 70 to determine the position and heading of the marine vessel 10 and the position and heading of the trailer 50. For example, the camera(s) 72 would determine the scale and orientation of the ArUco markers 68, 70 and could thereafter determine their 3-D locations from a 2-D image. The position determination module 52 could calculate where the camera 72 was located with respect to the markers 68, 70 based on a series of images. The CCM 24 would then use the same algorithms to determine the geometry of the trailer 50 and the path the vessel 10 should take to the trailer 50 as those described herein above with respect to the RFID tags and RFID receiver(s). In another example, the position determination module 52 uses information regarding positions of the ArUco markers 68, 70 from the camera 72 to supplement the determination of the position and heading of the marine vessel 10 and the position and heading of the trailer 50 as determined by information from the RFID tags and receivers.

In other embodiments, the RFID receivers 38 and/or 40 may instead be radio frequency identification and geometry (RFIG) units, which determine location, poise, motion, and orientation information using photovoltaic components and IR-LEDs on the receiver's integrated circuit. Other technologies, such as sonar, other visual recognition devices, and/or photo-sensitive diodes could be used to supplement the RFID position determination system described herein. For example, if flashing lights were provided on the trailer 50, their identifications could be signaled by way of the light being a certain color or the light flashing at a certain frequency.

Benefits of the above-described auto-trailering feature are that an operator of the marine vessel 10 may be able to step off the vessel 10 onto a dock or pier and ready other apparatuses on the trailer 50 for chaining the vessel 10 thereto or start loading his truck with supplies. The operator need not fear that his manual trailering of the vessel 10 is taking too long, especially when the water access area is crowded. Other options include installing RFID tags on a fob, lanyard, or life jacket, such that if the operator falls overboard, the trailering system 100 would be able to detect this and stop the trailering procedure, such as by killing the engines 14a, 14b or shifting the transmissions 16a, 16b to neutral. This type of algorithm might require a 3-D coordinate system to be defined, in order to determine if the tag on the fob, lanyard, or life jacket is below the trailer 50 or the vessel 10. The RFID tags could be programmable such that they can be installed on a dock or pier, to enable auto-docking features that would be carried out in ways similar to the auto-trailering feature described herein above. For example, the CCM 24 may provide for mode selection between trailering and docking. The mode selection could be done by the operator via the input pad 29, could be suggested based on visual cues from the camera 72, or could be encoded directly in the RFID tags or ArUco markers, which would report what type of feature they are marking (trailer, slip, dock, etc.). In this way the path planning module 58 could know how to approach the target. In one example, the coded tags could be used to indicate a position on a dock at which the vessel 10 is to be berthed, and could mark the front and back of the desired berthing location. One exemplary algorithm for the CCM 24 to use while undertaking such a docking procedure is described in U.S. Pat. No. 7,561,886, which was incorporated by reference herein above.

In the above description certain terms have been used for brevity, clarity and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A system for automatically trailering a marine vessel, the system comprising:
    a set of coded tags coupled to a boat trailer, each coded tag in the set of coded tags including data regarding its location on the trailer;
    a tag reader located aboard the marine vessel, the tag reader estimating a first distance between the tag reader and a first coded tag in the set of coded tags and estimating a second distance between the tag reader and a second coded tag in the set of coded tags;
    a position determination module that uses the first and second estimated distances to determine a position and a heading of the marine vessel and a position and a heading of the trailer in a given coordinate system;
    a feedback control module that calculates a difference between the position of the marine vessel and the position of the trailer and a difference between the heading of the marine vessel and the heading of the trailer and determines marine vessel movements required to minimize the position difference and the heading difference; and
    a marine propulsion system that automatically actuates a marine propulsion device to produce the required marine vessel movements and thereby propels the marine vessel onto the trailer.

2. The system of claim 1, further comprising a user input device with which an operator of the marine vessel may select an automatic trailering mode of the marine propulsion system.

3. The system of claim 2, wherein, in response to selection of the automatic trailering mode, the marine propulsion system will not trailer the marine vessel unless the tag reader determines that the tag reader is within a given distance of at least one coded tag in the set of coded tags.

4. The system of claim 3, wherein, while trailering the marine vessel, the marine propulsion system propels the marine vessel with a first predetermined thrust until the tag reader determines that a bow of the marine vessel has reached a predetermined position on the trailer, in response to which the marine propulsion system propels the marine vessel with a second predetermined thrust that is greater than the first predetermined thrust.

5. The system of claim 1, wherein the set of coded tags comprises radio-frequency identification (RFID) tags and the tag reader is an RFID receiver.

6. The system of claim 1, wherein the set of coded tags comprises ArUco markers and the tag reader is a camera.

7. The system of claim 1, wherein the tag reader also estimates a first angle between the tag reader and the first coded tag and estimates a second angle between the tag reader and the second coded tag.

8. The system of claim 7, further comprising a GPS-enabled inertial measurement unit (IMU) that provides global coordinates of a predetermined location on the marine vessel in latitude and longitude and an absolute heading of the marine vessel with respect to North to the position determination module;
    wherein the position determination module determines an absolute heading of the trailer with respect to North using the first and second estimated distances, the first and second estimated angles, and the absolute heading of the marine vessel.

9. The system of claim 8, wherein only one tag reader is located aboard the marine vessel.

10. The system of claim 1, further comprising an additional tag reader, wherein each tag reader is located along a longitudinal centerline of the marine vessel, and wherein each tag reader estimates the first distance between the respective tag reader and the first coded tag and the second distance between the respective tag reader and the second coded tag.

11. The system of claim 10, wherein each coded tag stores data regarding its location on the trailer in relation to a local coordinate system; and
    wherein the position determination module determines the position and the heading of the marine vessel with respect to the local coordinate system.

12. A method for automatically trailering a marine vessel, the method comprising:
    receiving an operator selection of a trailering mode that automatically trailers the marine vessel on a boat trailer;
    reading signals from a set of radio-frequency identification (RFID) tags coupled to the trailer with an RFID receiver, each RFID tag in the set of RFID tags storing data regarding its location on the trailer;
    using the signals to estimate a first distance between the RFID receiver and a first RFID tag in the set of RFID tags and to estimate a second distance between the RFID receiver and a second RFID tag in the set of RFID tags;
    using the first and second estimated distances to determine a position and a heading of the marine vessel and a position and a heading of the trailer in a given coordinate system;
    calculating a difference between the position of the marine vessel and the position of the trailer and a difference between the heading of the marine vessel and the heading of the trailer;
    determining marine vessel movements required to minimize the position difference and the heading difference; and
    outputting the required marine vessel movements to a marine propulsion system that thereafter actuates a marine propulsion device to propel the marine vessel onto the trailer without further intervention from an operator of the marine vessel.

13. The method of claim 12, further comprising automatically trailering the marine vessel in response to selection of the trailering mode only if the RFID receiver determines that the RFID receiver is within a given distance of at least one RFID tag in the set of RFID tags.

14. The method of claim 13, further comprising automatically propelling the marine vessel with a first predetermined thrust while trailering the marine vessel until the RFID receiver senses that a bow of the marine vessel has reached a predetermined position on the trailer, and thereafter automatically propelling the marine vessel with a second predetermined thrust that is greater than the first predetermined thrust.

15. The method of claim 14, further comprising automatically shifting the marine propulsion system into neutral in response to the RFID receiver sensing that the bow of the marine vessel has reached a front end of the trailer.

16. The method of claim 12, further comprising estimating a first angle between the RFID receiver and the first RFID tag and estimating a second angle between the RFID receiver and the second RFID tag.

17. The method of claim 16, further comprising:
  determining global coordinates of a predetermined location on the marine vessel in latitude and longitude and an absolute heading of the marine vessel with respect to North using a GPS-enabled inertial measurement unit (IMU);
  determining an absolute heading of the trailer with respect to North using the first and second estimated distances, the first and second estimated angles, and the absolute heading of the marine vessel; and
  determining global coordinates of a target location on the trailer in latitude and longitude using the first and second estimated distances, the first and second estimated angles, and the global coordinates of the predetermined location on the marine vessel.

18. The method of claim 17, further comprising sending the absolute heading of the trailer and the global coordinates of the target location on the trailer to a feedback control module, which determines and outputs the required marine vessel movements to the marine propulsion system.

19. The method of claim 12, wherein the RFID receiver is located along a longitudinal centerline of the marine vessel, and further comprising:
  estimating a first distance between the RFID receiver and the first RFID tag;
  estimating a second distance between the RFID receiver and the second RFID tag;
  estimating a first distance between a second RFID receiver located along the longitudinal centerline of the marine vessel and the first RFID tag;
  estimating a second distance between the second RFID receiver and the second RFID tag; and
  determining the position and the heading of the marine vessel with respect to a local coordinate system defined by the data stored on the RFID tags using the first distances between each RFID receiver and the first RFID tag, respectively, and the second distances between each RFID receiver and the second RFID tag, respectively.

20. The method of claim 19, further comprising calculating and sending the difference between the position of the marine vessel and the position of the trailer and the difference between the heading of the marine vessel and the heading of the trailer with respect to the local coordinate system to a path planning module, which thereafter determines an absolute heading of the trailer with respect to North and global coordinates of a target location on the trailer in latitude and longitude; and
  sending the absolute heading of the trailer and the global coordinates of the target location on the trailer to a feedback control module, which determines and outputs the required marine vessel movements to the marine propulsion system.

\* \* \* \* \*